United States Patent Office 3,526,328
Patented Sept. 1, 1970

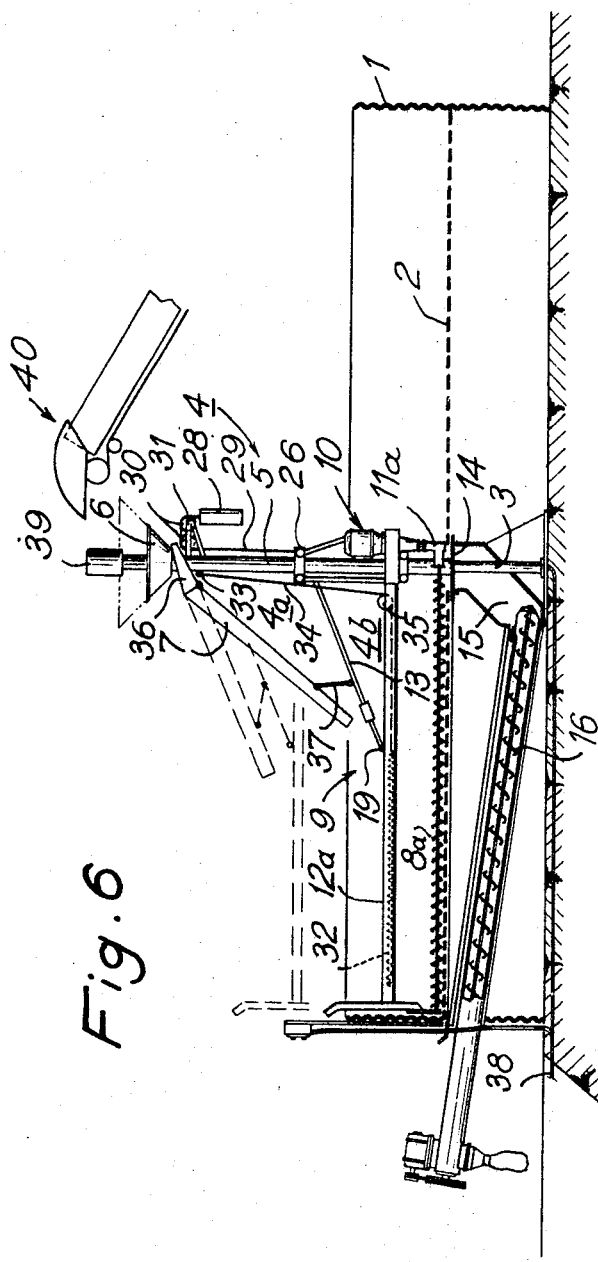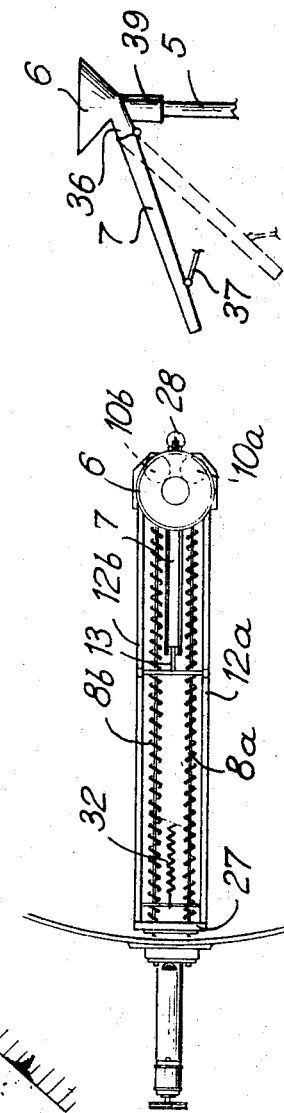

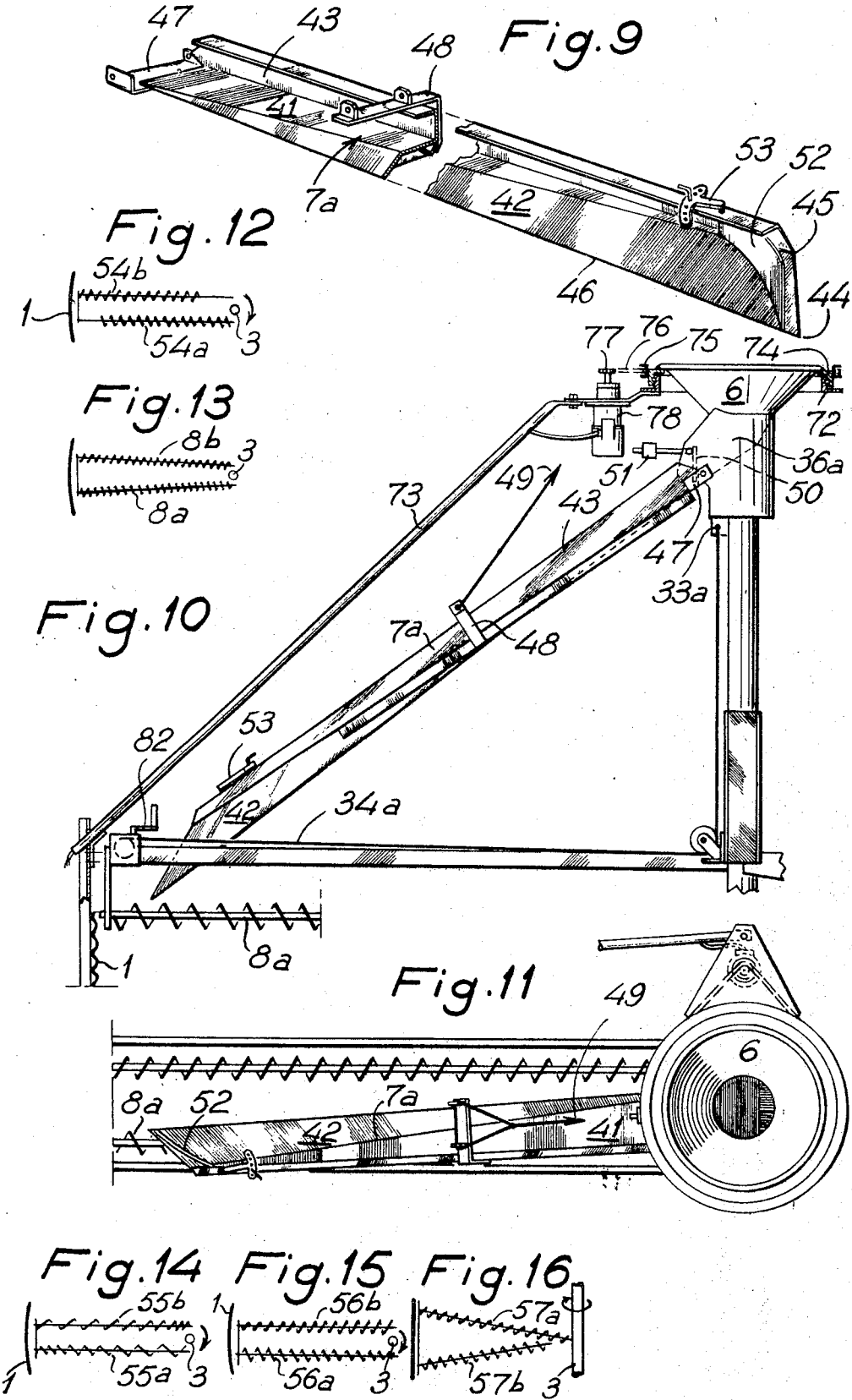

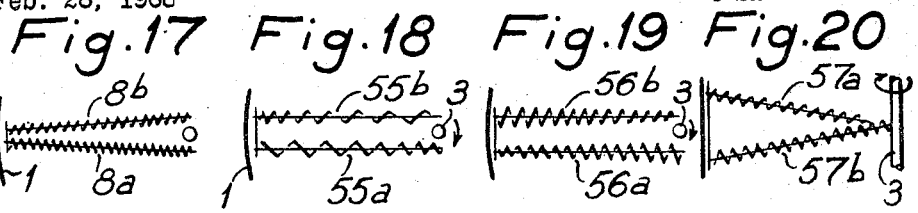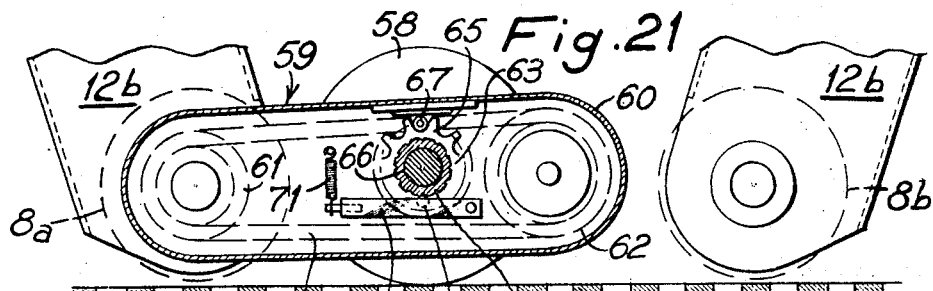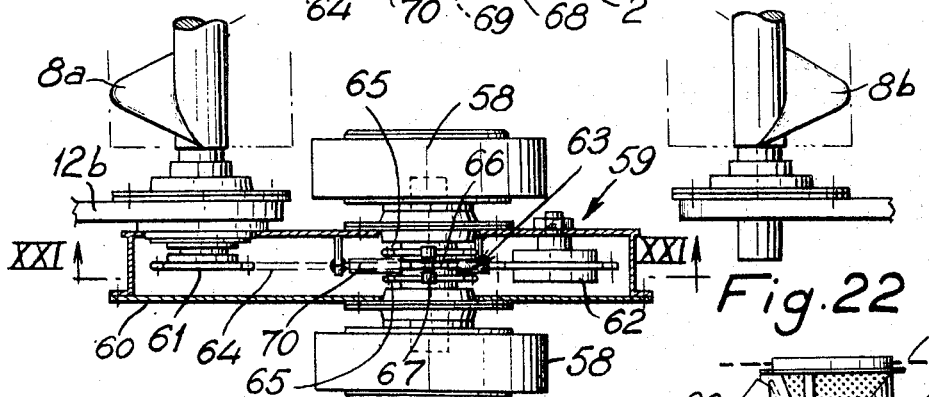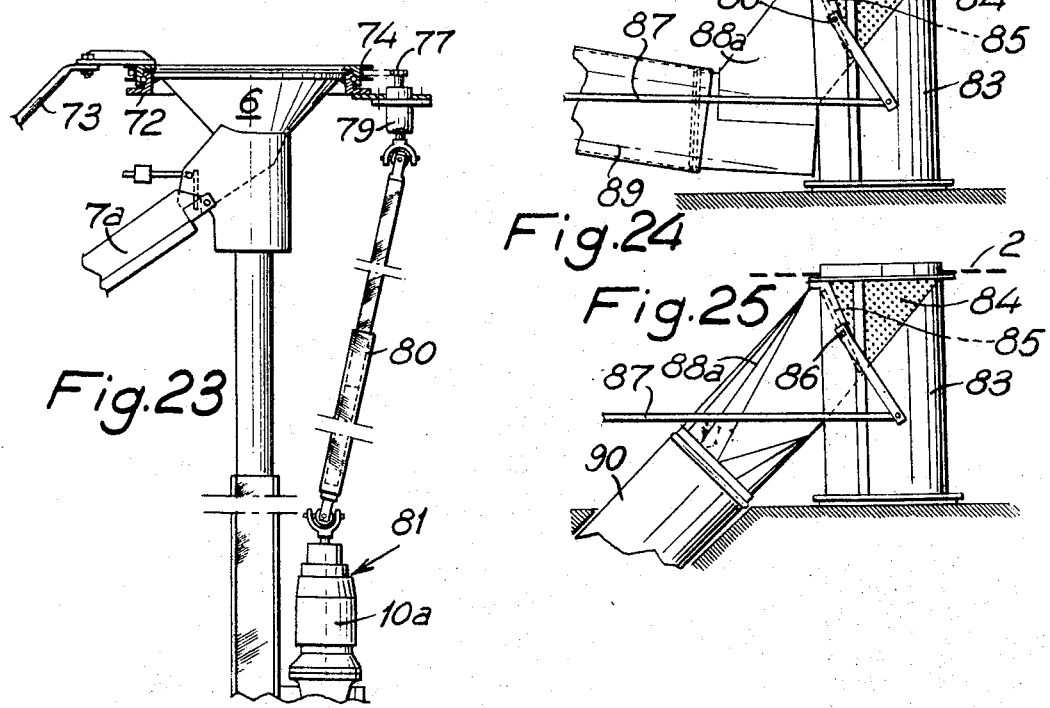

3,526,328
DEVICE FOR HANDLING BULK MATERIALS, NOTABLY CEREALS
Jean-Claude Edgard Marie Garret, Saint-Nicolas d'Acy, and René Charles Pelletier, Senlis, France, assignors to Etablissements Law, Senlis, Oise, France
Filed Feb. 28, 1968, Ser. No. 709,102
Claims priority, application France, Mar. 3, 1967, 97,363; Feb. 20, 1968, 140,458
Int. Cl. B65g 65/46
U.S. Cl. 214—17                         19 Claims

ABSTRACT OF THE DISCLOSURE

A bulk material handling device comprises a bin having a feed device for the supply of material, and two parallel, helicoidal screws in the bin driven in rotation for displacing the material linearly, either in the same direction or in opposite directions, the screws being mounted on a support for revolving in the bin under the action of the engagement of the screws with the material, the bin also having a means for emptying material therefrom.

---

This invention relates to a device for facilitating homogenization, especially of granular products to be dried and most notably of cereals.

A device for handling bulk materials according to this invention includes two components for shifting the material linearly, which are positioned adjacent each other and which are effective in shifting the material either in the same or in opposite directions, said components preferably being two parallel helicoidal screws.

The present invention relates to a device for facilitating handling operations, notably of granular products to be dried and of cereals in particular. For the purpose of emptying the cylindrical false-bottomed storage bins through a central hole, it is customary to use a device comprising a horizontal so-called "scavenger" screw adapted to revolve about a central vertical axis. Heretofore, however, such a device has been usable only for emptying a single bin; further, the use of a single screw means that a considerable quantity of grain (corresponding to the thickness of the screw) is left in the bin.

It is accordingly the object of this invention to overcome this latter-mentioned disadvantages and to furthermore permit multiple uses of such a device, an example being— in addition to emptying the bin under gravity—continuous filling thereof with an evenly spread product and homogenization of the latter while it is drying; for with the static form of drying carried out with hot air delivered beneath a uniform thickness of material, the lower layers are overdried whereas the upper layers are barely dried, thereby calling for a homogenization throughout the body of the material, which must be accomplished by stirring during and after drying.

The present invention consequently relates to a device for handling bulk material that includes two components for shifting the material linearly, which are positioned adjacent each other and which can be effective in moving the material in the same or in opposite directions. Preferably, these components are two parallel helicoid screws which are advantageously positioned horizontally and revolvably mounted about a vertical axis.

In accordance with the invention, in order to improve the homogenizing motions, the components may be adjusted by translation relative to each other and by being tilted relative to the horizontal. The components can furthermore be shifted vertically in relation to the bulk of material, and it may be advantageous to segregate the frictions caused by revolution and by translation by mounting said components on a carriage sliding vertically on a sleeve adapted to pivot about a central shaft.

The description which follows with reference to the accompanying non-limitative exemplary drawings will give a clear understanding of how the invention can be carried into practice.

In the drawings:

FIG. 6 is a diametrical sectional view of a second form of embodiment of a device according to the invention.

FIG. 7 is a fragmental top view of the device in FIG. 6.

FIG. 8 shows an alternative possible position of the collector in relation to the hopper in the device of FIG. 6.

FIG. 9 is a perspective view of a spout in accordance with yet another possible form of embodiment.

FIG. 10 shows in fragmental side elevation a device equipped with said spout and with revolving means (moved into the plane of the figure).

FIG. 11 is a top view of the device in FIG. 10.

FIGS. 12 through 20 are different possible designs and arrangements for the pair of screws.

FIG. 21 is a side elevation of a rolling device with reduction gear, viewed in section on the line XXI-XXI of FIG. 20.

FIG. 22 is a top view corresponding to FIG. 21.

FIG. 23 is a partial side elevation view of a device equipped with an alternative embodiment of revolving means.

FIGS. 24 and 25 show an alternative embodiment of the emptying collector, connected respectively to two differential retrieval devices.

Figure 1:
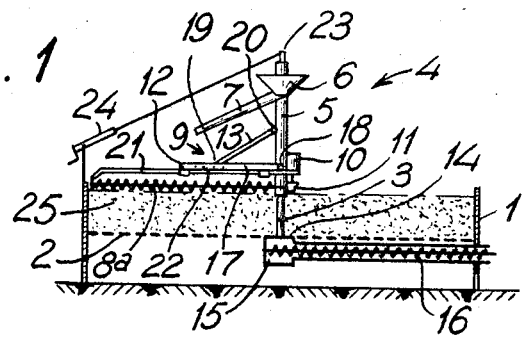
FIG. 1 shows in diametrical section a first embodiment of a device according to the invention and illustrates its manner of operation in the loading and spreading functions.

The circular system shown in the drawings is adapted for operation with a cylindrical bin or static dryer 1 having a flat false bottom 2 and includes a central vertical mast 3 and a moving unit 4 thereon. This moving unit includes a first assembly 4a consisting of the rotating sleeve 5 mounted on mast 3 through the medium of bearings, a reception hopper 6 fitted over the top of sleeve 5, and a variable-radius grain spout 7 communicating with the bottom of hopper 6 and extending radially relatively thereto. Said moving unit further includes a second assembly 4b consisting of two parallel Archimedes screws 8a and 8b formed with opposite threads (i.e. with righthand and lefthand threads, respectively), a supporting block 9 which supports the screws 8 so that they extend horizontally between sleeve 5 and the wall of bin 1, an electric motor unit 10 positioned above the screws with its axis vertical, and bevel gearing 11 through which motor unit 10 drives the screws 8 and which includes a reduction gear. Supporting block 9 comprises a horizontal suspension structure 12 and an inclined strut 13, one end 19 of which is rigidly connected to the structure 12, proximate the middle thereof. Below a central hole 14 formed in the center of false bottom 2 is provided a discharge collector 15 and a screw 16 for retrieving the material therefrom and conveying it outside the bin.

In the embodiment illustrated in FIGS. 1 to 5, suspension structure 12 includes a slide 17 of which one end 18 is fixed to sleeve 5 and which is slidingly supported in its middle by the end 19 of strut 13, the other end 20 of which is rigid with the sleeve 5, above attachment point 18. The structure 12 further includes a reinforcement 21 for supporting the screws 8a and 8b, which are thus positioned at a certain distance beneath reinforcement 21. The latter slides along the slides 17 and is made fast therewith by suitable securing means 22. The length of reinforcement 21 is somewhat greater than the radius of the bin, so that when one of its ends contacts the bin wall the other end extends beyond the sleeve 5 to form a supporting surface on which the motor unit 10 with its vertical shaft is mounted.

The spout 7 extends radially and slightly forward of the operative screw. In addition, mast 3 is provided at its top with an angled coupling 23 (consisting for instance of a worm and pinion) rigid with an operating handle 24, whereby the whole unit 4 can be translated vertically with respect to the mast 3 as it is guided by its sleeve 5. The worm gear is accordingly formed at one end of a shaft having its other end screwed into the mast 3 and formed with a bearing surface to support the sleeve 5.

The device hereinbefore described operates as follows.

The two screws 8a and 8b are rotated about their axes by motor unit 10. Thus, on coming into contact with the material 25 contained in the cell, not only do they carry the material along their axis but they also react against it, i.e. they use the resistance of the material to shift to cause the screws to revolve about the mast 3 together with the entire moving unit. This means that, of the energy supplied by the motor unit, part is used to shift the material and part to revolve the compound. It will also readily be comprehended that, notwithstanding the symmetry of the twin screw system, the revolving motion will be sustained in a specific direction once it is started in that direction, for since the second screw encounters less material than the first, its reaction against the material will be greater than that of the first screw, thus inducing the motion.

As shown in FIG. 1, such a device may be used for loading a material and spreading it evenly by causing the two screws to rotate in the same direction about their axes, with the two screws slowly revolving bodily about the central mast 3 as the material is fed in through hopper 6 and spout 7. The device can be used in particular for spreading grain in a dryer, such spreading being effected very satisfactorily as one of the screws tends to carry the grain towards the center and the other to spread it out along the periphery (owing to their opposite threads).

Figure 2:
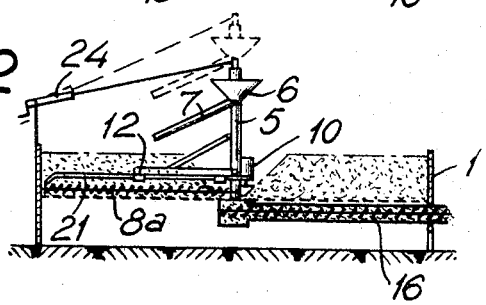
FIG. 2 illustrates the manner of operation of the device in FIG. 1 in the emptying function.
Figure 3:
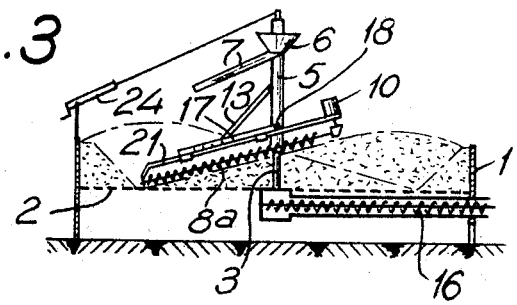
FIGS. 3, 4 and 5 illustrate three different arrangements for operation of the device of FIG. 1 in the homogenizing mode.
Figure 4:
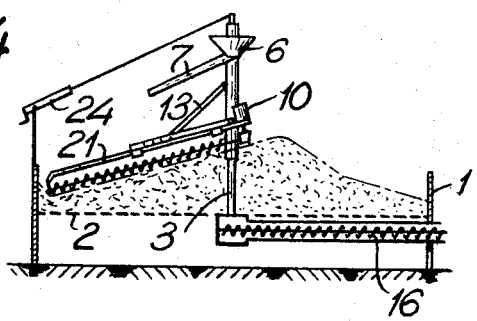
Figure 5:
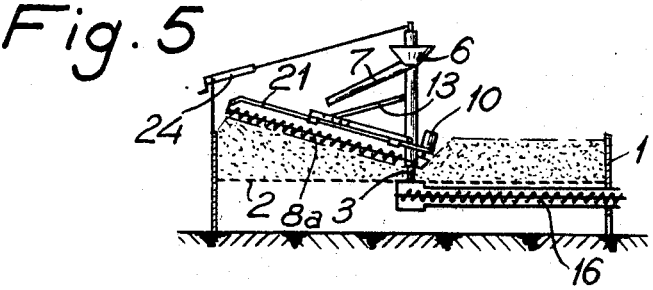

As FIG. 2 clearly shows, the same device can be used to empty a bin. The two screws are then rotated so that both tend to carry the grain toward the center, i.e. by rotating them in opposite directions about their axes, for instance by using two oppositely rotating motors or suitable gearing. The device is lowered from the position shown in broken lines (which is the position corresponding to FIG. 1) down to the position shown in solid lines wherein the screws are positioned above the false bottom of the bin. The grain then advances slowly toward the center over the false bottom, and whichever of the two revolving screws is in the lead bites into the mass of grain over its full depth while the second screw clears the false bottom. By virtue of the provision of this second screw there will be virtually no grain left in the bin, whereas a considerable quantity would fail to be emptied with a conventional single-screw system.

As shown in FIGS. 1, 3, 4 and 5, the same device can be used to "homogenize" or stir the contents of the bin in order to speed up the drying, notably by helping the moisture to drain to the false bottom. This homogenizing can be performed at the surface by leaving the two screws horizontal and allowing them to revolve about the central mast in the same way as for spreading the material (FIG. 1). This enables the entire surface of the grain to be stirred over a depth of as much as twice the diameter of the screws, for example over a depth of 20 centimeters for screws with a diameter of 100 millimetres. Equally, the body of the grain can be stirred more thoroughly by tilting the screws to the horizontal, the screws being so tilted that the slide 17 is inclined downwardly in the case of FIGS. 3 and 4 and upwardly in the case of FIG. 5. Whereas in the case of FIGS. 4 and 5 the reinforcement 21 is in a normal position relatively to slide 17, in the case of FIG. 3 it is shifted so that a considerable part thereof, for instance one-third, protrudes from the other side of sleeve 5. In each of these configurations, the two screws may be rotated either in the same direction or in opposite directions about their axes.

In this first embodiment, the second assembly 4b of the device is rigid with the first assembly 4a, and, through the agency of sleeve 5, the whole unit is capable both of translating along and revolving about mast 3. In contradistinction, in the embodiment shown in FIGS. 6 and 7, the two relative motions do not take place between the same parts, the second assembly 4b being translatably mounted on the first assembly 4a which, through the agency of its sleeve 5, can only revolve about the mast 3. Motor unit 10 comprises two vertically mounted electric motors 10a and 10b which rotate the screws 8a and 8b through angled drives 11a and 11b, while the reinforcement 12 is formed by two supporting arms 12a and 12b. The two arms 12a and 12b and the strut 13 are fixed to a carriage 26 which is vertically slidable through the medium of two slides cooperating with rails carried by the sleeve 5. Thus, the second assembly 4b consisting of carriage 26, arms 12a and 12b, screws 8a and 8b, motors 10a and 10b, angled drives 11a and 11b, and strut 13, can shift vertically over sleeve 5.

Arms 12a and 12b have their outer ends interconnected by a vertical plate 27 carrying end-bearings for supporting one end of screws 8a and 8b, the other ends of which are carried in the angled drives 11a and 11b. Carriage 26 is made fast with a balancing counterweight 28 by means of a cable 29 running over pulleys 30 carried by a bracket 31 fixed to the top of sleeve 5. To the outer end of arms 12a and 12b is fixed a balancing tensile spring 32 which is co-extensive with the arms and which is anchored to a point 33 located on sleeve 5 beneath the attachment point of spout 7 by means of a cable 34 running over an intermediate pulley 35 carried by the arms. Spout 7 is articulated in relation to a fixed portion 36 thereof rigid with the sleeve 5 and positioned beneath the hopper 6. Spout 7 is furthermore fastened by a link 37, at a point adjacent its outer end, to the strut 13, substantially midway therealong. The hopper consequently guides the grain when the dryer is being filled, and the spout tilts up or down in step with the upward and downward movements of the second assembly 4b, thereby enabling the dropping point of the grain to be moved away from or toward the center.

An electric power supply 38 is led into central mast 3 and connected to electric motors 10a and 10b, which motors are carried by the carriage 26 through the medium of a conventional rotating slip-ring 39 placed at the top of mast 3 and sleeve 5 and having its inner portion rigidly united with the mast 3 and its outer portion rigidly united with the sleeve 5.

In the alternative embodiment shown in FIG. 8, slip-ring 39 is positioned on mast 3 and sleeve 5 at a level below that of hopper 6 and the fixed portion 36 of spout 7. Conventional grain feed apparatus 40 is disposed vertically above the hopper 6.

The theory of operation with this particular arrangement is similar to that described precedingly, except that the revolving and translating motions relative to mast 3 are obtained with separate mechanisms.

In the constructional form of FIGS. 6 to 8 the spout 7 distributes the material over a radius which varies automatically during the filling operation so that any impurities contained in the material may also be evenly distributed over the entire surface.

However, the particles of material discharged from the end of the spout describe parabolas whereas the impurities, which are usually lighter, rain down and form a ring matching the radius of the spout. Further, the material itself is not very homogeneous, resulting in an uneven distribution; further, because the device is used as a drying system, different losses of charge occur and cause unequal drying. Moreover, since the spout is rigid with the sleeve and bears through an articulated system upon the screw structure, the weight of the spout and of the material flowing through it, which is considerable, is transferred to the screws, thus appreciably hindering their upward motion owing to the fact that they are mounted on the floating principle, i.e. their vertical position adapts automatically to the grain level, whereas in point of fact the filling operation requires that the load on the screws be relieved.

Accordingly, in an alternative form of embodiment, the spout is no longer rigid with the screws and comprises a surface 41 substantially parallel to its longitudinal axis, and this surface 41 is extended by a lateral lip 42, whereby the material and its impurities fall from the entire length of the spout instead of from its end only, thus ensuring as homogeneous a distribution as possible. Preferably, the angle formed between the lip 42 and the plane of the surface 41 is included between 0° and 90°.

The spout may advantageously include means for distributing the material in a layer of uniform thickness. With such a layer, the theoretically most effective shape for the joint line between lip 42 and surface 41 in order to obtain a uniform distribution of fall is a curve, usually a parabola, but in practice the joint line may be a straight line.

Preferably, the spout is as long as possible so as to cover the entire length of the screws, and is also as wide as possible so as to permit satisfactory spreading of the layer. It is furthermore necessary that the material should fall squarely on the screws, and to this end the spout is preferably fitted with a chute beneath its lip, so that the material for the layer follows this chute, substantially along the lines of steepest slope. This provides an initial distribution which is already very satisfactory in itself and which the screws merely perfect, thereby reducing their work and enabling the filling rate to be considerably increased.

This spout remains fixed during filling, but is preferably adjustable in inclination prior to utilization to suit the material being handled.

The end of the spout may be fitted with a deflector if desired, in order to prevent the material from falling beyond the end of the screw.

Finally, the spout may be appropriately oriented with respect to the mast in order to improve the outflow and the levelling during filling operations.

Accordingly, the spout 7a shown in FIGS. 9 to 11 includes a right triangle shaped surface 41 which has a downwardly-bent flat triangular chute 42 adjoining its hypotenuse and an upwardly-bent vertical wall 43 adjoining its longer side. The outer end 44 of chute 42 projects further than the tip 45 of the surface 41, and the discharge edge 46 of chute 42 lies in a vertical plane parallel to the wall 43. The height of wall 43 tapers off toward the tip 45. The smaller side of surface 41 is rigid with a U-shaped bracket 47 pivotally connected about a horizontal axis to the fixed spout portion 36a. The portion 36a, and hence the spout, may if necessary be orientated through a small angle about the hopper-sleeve assembly, depending on the nature and condition of the material handled. Midway along the spout is fixed a transversely extending bracket 48 connected to adjustable suspension means 49. The portion 36a, which is below the feed hopper 6, is provided with a flap 50 hinged about a horizontal axis, and this flap is loaded by an adjustable counterweight 51 and distributes the material in a uniform layer. The outer end 44 of chute 42 lies at a point above the end of one of the homogenizing screws 8a and slightly ahead thereof in the direction of the other screw 8b. A vertical deflector 52 bears on the outer end of said chute and is hinged to the surface 41 and includes means 53 for adjusting its angular setting.

In the two forms of embodiment of FIGS. 1 to 8, the screws are parallel and of constant pitch. When these screws are driven in the same direction for filling and homogenizing, the material is conveyed by one screw toward the center, where it is taken up by the other screw which carries it out to the periphery where it is taken up once more by the first screw.

However, despite the overall levelling effect obtained, a central mound is formed at the end of the first screw around the mast, and a peripheral banking against the wall of the bin at the end of the second screw. These formations, which are slopes of repose, are due to the spacing between the screws and would not exist if the screws could be placed side by side without an intervening gap—which is not practicable.

Accordingly, in alternative constructional forms which enable virtually perfect levelling to be achieved, the screws are shaped or disposed so as to eliminate such formations, by causing the screws to displace less material toward their discharge ends. The depth of each helix can be tapered toward one end of the screw, preferably in the direction of entrainment of the material by that screw; alternatively, the helix could be stopped short of the discharge end of the screw, or its pitch could be reduced, again preferably in the direction of entrainment of the material by that particular screw. Any one of these three modifications may be made to one or both screws; alternatively, the screws may be set at a preferably outwardly converging angle in the horizontal plane, since it is preferably to reduce the peripheral mound, the volume of which is greated. Another possibility would be to position the screws at an angle to each other in the vertical plane, preferably with the same degree of inclination and with the material discharge end of one screw positioned beneath the material retrieving end of the other screw. The choice between these different possible arrangements will be dictated by the nature, the purity, the degree of homogeneousness and the dampness of the material to be handled.

Thus, in the case of FIG. 12, the threads of the screws 54a and 54b stop short of the wall of bin 1 and of the mast 3 respectively. In the case of FIG. 13, the screws 8a and 8b converge toward the mast 3 and in the case of FIG. 17 toward the wall 1. The screws 55a and 55b shown in FIG. 14 have helices the pitches of which gradually diminish in the direction of wall 1 and mast 3 respectively, and vice versa in the case of the helices of the screws in FIG. 18. The screws 56a and 56b in FIG. 15 have helices the depths of which gradually increase toward the wall 1 and toward the mast 3 respectively, and vice versa in the case of the screws of FIG. 19. The screws 57a and 57b in FIG. 16 are caused to slope downwardly and upwardly, respectively, toward mast 3, by respectively lowering and raising their outer bearing, and vice versa in the case of the screws in FIG. 20. Alternatively, the screws could be arranged cruciform-fashion in the vertical plane instead of being arranged V-fashion. The screws 54b, 55b, 56b and 57b are those which displace the material toward the mast, and the configuration of FIGS. 17 through 20 are considered more advantageous than those of FIGS. 13 through 16.

In the form of embodiment of FIGS. 1 to 8 the work in rotating the screws about their axes is divided between the work in displacing the material and the work in making the screws revolve about the mast by thrusting against the material, this revolving motion being normally engendered in this way only.

Now it could happen that the torque involved in this latter form of work is low, owing for example to the nature or condition of the material or to the fact that, during the emptying operation, i.e. when the screws rotate in opposite directions, their respective torques are subtracted from each other, whereas they are added together during the filling and homogenizing operations. Another possibility could be the existence of a high opposing torque, resulting for example from heavy friction between the sleeve and the mast.

Accordingly, in an alternative constructional form, at least one of the screws is rigidly connected to a rolling member which bears against the bottom of the bin, and since there must always necessarily be a certain interval between the screw and the bottom, this gives the set of screws an automatic lead. Preferably, in order to avoid rapid wear or damage to this member and to the bottom of the bin, due to overly high speeds when the member engages directly with the screw, the latter are coupled through a speed reduction device. The speed reduction ratio is preferably adjustable so as to enable the speed of the rolling member to be varied and the angular velocity of rotation of the device, and hence its emptying rate, to be adjustable as a function of the retrieval capacity of the apparatus installed downflow of the bin.

The drive shown in FIGS. 21 and 22 includes two floating wheels 58 which roll along the perforated sheet-metal false bottom 2 and which are connected through a chain-driven reduction gear 59 to the first of the two screws 8a and 8b mounted on the assembly 12b. The reduction unit includes, within a case 60 oscillatably mounted on assembly 12b above the shaft of screw 8a, sprocket 61 rigid with the screw 8a, an intermediate sprocket 62 loosely mounted on the case 60, a central output pinion 63 rigid with the wheels 58 (which are external to said case), and a chain 64. Pinion 63 is formed with two toothed webs 65 on either side of a disc 66 of smaller diameter. The chain 64 runs over these sprockets 61 and 62 between the toothed web 65, and one or more of the chain rollers 67 project on either side so as to be capable of engaging with the teeth 65. The disc 66 is formed with a number of cups 68 equal to the number of teeth in the toothed webs 65 and carries in each one in succession a ball 69 carried by a support 70 which is urged against the ball by a spring 71. This brake makes it possible to stop the pinion 63 after a chain roller 67 has moved into the exact position corresponding to reception of the next roller 67. The reduction ratio is adjusted by varying the number of rollers 67 on the chain 64.

In the form of embodiment of FIGS. 6 to 8 the screws are mounted in floating fashion and are balanced by counterweights. Now in the event of an irregularity in the inflow of material, notably in respect of the flow rate or the quality, accumulation will occur in the form of radial mounds. The screws then have even more difficulty in advancing, thus slowing down the system precisely where it should speed up. This will often entail crowding, with resulting stoppages, thus requiring continuous supervision.

Accordingly, in alternative forms of embodiment the object of which is to make to drive to the device completely automatic in order to prevent any slowing down, said device is equipped with means, for revolving it about the mast, which are rigid with the rotating sleeve-hopper assembly. Further, in order to allow the screws to rise and fall automatically and follow the level of the material in the bin during filling and emptying, the device can be equipped with means, for translating the screws vertically, which are rigid with the sliding unit comprising the screws, an example being a winch. Preferably, both the above-mentioned means are slaved, the former to means for detecting a sudden increase in level and the latter to a level follower.

The drive shown in FIG. 10 includes a ball-bearing having its fixed inner race 72 supported by a restraining arm 76 to the bin 1 and its outer race 74 rigid with the hopper 6. The race 74 is formed with a guiding groove 75 fitted with pegs for rotation by a chain 76 which runs over a spricket 77 driven by a motor/reduction-gear/safety-clutch unit 78 fixed to the arm 73 which also supports the power supply gear for this unit.

The drive shown in FIG. 23 likewise includes a ball-bearing having its outer race 74 rigid with a sprocket 77, but this race is carried by the fixed arm 13 whereas the inner race 72 bears a device 79 which drives the sprocket 77 and which, through a sliding double-universal-jointed transmission, is connected to a driving and emergency release motor/reduction-gear/clutch unit 81 which comprises one of the motors 10a for the main screws. In both embodiments, the motor may be slaved to means for sensing an increase in the level of the material.

As is likewise shown in FIG. 10, the screw structure 12b supports at its outer end a winch 82 which is equipped with a handle lock and by means of which it is possible to wind in a cable 34a which extends along the structure and then rises up the mast to a fixed point 33a. Clearly, this winch could be replaced by a worm screw system, for instance. Either the winch or the worm system may be slaved to a level sensor.

In the form of embodiment of FIGS. 6 to 8, the emptying collector is leaktightly closed by a slide valve designed to prevent drying air from entering the material retrieving device. On the other hand, the presence of this valve impairs ventilation of the central part of the bin.

Accordingly, in an alternative form of embodiment, the object of which is to overcome this drawback and permit a satisfactory flow of material toward the retrieval device and to adjust or cut off the flow, clear the bin easily and retain a minimum of material therein so that a change of material can be made without extensive cleaning, the emptying collector is equipped with a flap in its middle, and its wall is perforated above this flap. Preferably, the manifold may be formed with joining means adaptable to different types of retrieving devices.

The collecting trough shown in FIGS. 24 and 25 comprises a body 83 of square section which is joined to the opening in false-bottom 2 and which embodies two perforated triangular portions 84 extending from this joint toward its middle. Disposed within the body 83 is a flap 85 with a horizontal pivot 86 mounted between a pair of sides of the two portions 84 and connected to actuating means 87. To the wall of body 83, on the same side as pivot 86, is joined the inlet end of an enclosure 88a (or 88b) the outlet end of which may be connected either to elevating screw-conveyor type retrieval means 89 or to gravity-operated retrieval means 90 placed in a pit; alternatively, the enclosure 88a could be connected to a horizontal screw-conveyor or scraper-type belt-conveyor.

The various devices hereinbefore described are effective in permitting automatic and rapid handling operations, notably in the case of cereal storage or drying bins for which great flow quantities can be achieved. Thus in the case of cereals and corn, filling and emptying rates with screws 100 mm. in diameter can attain 300 to 400 quintals per hour with bins five to eight meters in diameter, whereas an ordinary "scavenger screw" of the same diameter will give a maximum rate of 150 quintals per hour. A final advantage in the use of two screws is that the accumulation of impurities is avoided.

It goes without saying that many changes and substitutions of parts may be made to the specific forms of embodiment hereinbefore described without departing from the scope of the invention. By way of examples, the device could be used to handle bulk materials other than cereals, for instance granular products in general, or even nonsolid substances such as viscous product. Further, the mean used to diplace the material linearly could be other than helicoidal screws, such as scraper-type conveyors, in which case the subject device of the invention would require a special mechanism for revolving said means about the vertical axis. The screws could be mounted, not for revolving motion, but for translation—for instance horizontally and perpendicularly to their axes. Alternatively, the shaft could be inclined, while the feed means could be independent of the device, or non-coaxial therewith. Again, the drive means could be purely mechanical instead of electromechanical, while the inflow of material could take place at the periphery instead of the center.

What we claim is:

1. A bulk material handling device comprising a bin, feeding means for introducing material into said bin, rotatable support means in said bin, a first and a second assembly carried on said support means for displacing the material in a direction transverse to the axis of rotation of said support means, said assemblies being positioned adjacent each other, driving means for said first and second assemblies, said driving means including a first driving unit for driving the first assembly for displacing the material in a first transverse direction and a second driving unit for selectively driving the second assembly for displacing the material in a second transverse direction, and means for discharging material from said bin.

2. A handling device according to claim 1 wherein the support means can be adjustably inclined relative to a middle horizontal position.

3. A handling device according to claim 1 wherein said feeding means comprises a grain spout positioned above said first and second assemblies and having a lateral discharge outlet with a discharge chute.

4. A handling device according to claim 1 wherein said first and second assemblies for displacing the material are tilted with respect to the horizontal to the same extent but in opposite directions such that each assembly has a lower end constituting an outlet end and a higher end constituting an inlet end.

5. A handling device according to claim 1 comprising a counterweight for balancing the weight of said support means and said first and second assemblies.

6. A handling device according to claim 1 comprising means for driving said feeding means in the direction of rotation of said support means.

7. A handling device according to claim 1 wherein said rotatable support means comprises a central, vertical mast and a carriage rotatable around said mast and translatable therealong.

8. A handling device according to claim 7 wherein said support means comprises a rotatable sleeve on said mast and supporting said carriage for rotation and translation with respect to said mast.

9. A handling device according to claim 1 comprising means holding said feeding means fixed at a horizontal level.

10. A handling device according to claim 9 wherein said feeding means comprises a grain spout positioned above said first and second assemblies and pivotally connected about a horizontal axis.

11. A bulk material handling device comprising a cylindrical bin with a vertical axis, feeding means for supplying said cylindrical bin with material, support means positioned radially in the interior of said cylindrical bin and movable in rotation around said vertical axis, a first and a second assembly mounted in said bin on said support means for displacing the material in a radial direction in the bin, said first and second assemblies being positioned in the vicinity of each other, driving means for said first and second assemblies, said driving means comprising a first driving unit for driving said first assembly to displace the material in a first radial direction, and a second driving unit for selectively driving said second assembly to displace the material in a second radial direction opposite said first radial direction, and means for discharging said material from said cylindrical bin.

12. A handling device according to claim 11 wherein said support means comprises a vertical mast and a rigid sleeve rotatably mounted on said mast.

13. A handling device according to claim 11 wherein said first and second assemblies are positioned to diverge in a horizontal plane from said vertical axis.

14. A bulk material handling device comprising a bin, feeding means for supplying said bin with material, support means positioned inside said bin for revolving movement therein, first and second helicoidal screws mounted on said support means for displacing said material in a transverse direction with respect to said revolving movement, first and second drive means for selectively rotating said screws about respective axes thereof in opposite directions of rotation, and means for discharging said material from said bin.

15. A handling device according to claim 14 wherein each of said screws has a diameter which diminishes in the direction of material displacement of the particular screw.

16. A handling device according to claim 14 wherein each of said screws stops at a certain distance with regard to the extremity of the screw axis corresponding to that end where the material leaves the screw.

17. A handling device according to claim 14 wherein each of said screws has a thread which increases in diameter in the direction of material displacement.

18. A bulk material handling device comprising a bin, feeding means for supplying said bin with material, support means positioned inside said bin for revolving movement therein, first and second assemblies for displacing said material in a transverse direction with respect to said revolving movement, said first and second assemblies for displacing the material being positioned in the vicinity of one another and carried by said support means, driving means for said first and second assemblies, a rolling member carried by said assemblies and bearing against said bin to produce the revolving movement of the support means as the screws rotate, said driving means comprising first driving means for said first assembly for displacing the material in a first direction and second driving means for said second assembly for selectively displacing the material in a second direction opposite said first direction, at least one of said assemblies transmitting positive rotation to said rolling member, and means for discharging said material from said bin.

19. A handling device according to claim 18 comprising a speed reduction device between said rolling member and said at least one assembly which drives the rolling member in rotation along the bin at the bottom thereof.

References Cited
UNITED STATES PATENTS

| | | | |
|---|---|---|---|
| 3,129,828 | 4/1964 | Lusk | 214—17 |
| 3,229,828 | 1/1966 | Kucera | 214—17 |
| 3,297,177 | 1/1967 | Zeiter | 214—17 |
| 3,358,856 | 12/1967 | Weibull | 214—17 |

ROBERT G. SHERIDAN, Primary Examiner